United States Patent
Augustin et al.

(10) Patent No.: US 6,991,823 B2
(45) Date of Patent: Jan. 31, 2006

(54) NUTRITIONAL MINERAL FORTIFICATION OF MILK

(75) Inventors: Mary Ann Augustin, Victoria (AU); Roderick Patterson Winfield Williams, Victoria (AU)

(73) Assignees: Commonwealth Scientific & Industrial Research Organization Centre, Victoria (AU); Dairy Research & Development Corp., Victoria (AU)

( * ) Notice: Subject to any disclaimer, the term of this patent is extended or adjusted under 35 U.S.C. 154(b) by 214 days.

(21) Appl. No.: 10/240,169

(22) PCT Filed: Mar. 30, 2001

(86) PCT No.: PCT/AU01/00361

§ 371 (c)(1), (2), (4) Date: Sep. 30, 2002

(87) PCT Pub. No.: WO01/72135

PCT Pub. Date: Oct. 4, 2001

(65) Prior Publication Data

US 2003/0165597 A1  Sep. 4, 2003

(30) Foreign Application Priority Data

Mar. 31, 2000 (AU) ..................... PQ6607

(51) Int. Cl.
*A23C 9/20* (2006.01)

(52) U.S. Cl. .................. 426/580; 426/74; 426/521; 426/588

(58) Field of Classification Search ............... 426/580, 426/582, 74, 521, 588
See application file for complete search history.

(56) References Cited

U.S. PATENT DOCUMENTS

| | | | |
|---|---|---|---|
| 4,740,380 A | 4/1988 | Melachouris et al. | 426/590 |
| 4,871,554 A | 10/1989 | Kalala et al. | 426/74 |
| 4,919,963 A | 4/1990 | Heckert | 426/599 |
| 5,397,589 A * | 3/1995 | Korte et al. | 426/580 |
| 2003/0003192 A1 * | 1/2003 | Luhadiya et al. | 426/74 |

FOREIGN PATENT DOCUMENTS

| WO | WO 97/30601 | 8/1997 |
|---|---|---|
| WO | 00/64267 | * 11/2000 |
| WO | WO 01 01799 A | 1/2001 |

OTHER PUBLICATIONS

European Search Report for European Application No. EP 01 20 3615, dated Sep. 21, 2001.

* cited by examiner

*Primary Examiner*—Helen Pratt
(74) *Attorney, Agent, or Firm*—Foley & Lardner LLP

(57) ABSTRACT

A calcium and/or nutritional mineral fortified milk or milk powder product utilizes pyrophosphates or orthophosphates in combination with maintenance of pH within the range of 6.5 to 7.5 to render the milk heat stable. Additional calcium and/or nutritional mineral is added in soluble form either before or after the phosphate addition. The preferred orthophosphates are one or more of monosodium dihydrogen orthophosphate, disodium hydrogen orthophosphate, trisodium orthophosphate, monopotassium dihydrogen orthophosphate, dipotassium hydrogen orthophosphate and tri potassium orthophosphate. Addition of an alkaline agent to adjust the pH is not needed if an appropriate mix of orthophosphates is used. The milk products or milk products recombined from milk powders are heat stable and do not have the problems of translucency, gritty mouth feel or sedimentation which can be associated with other stabilized fortified milks.

5 Claims, No Drawings

NUTRITIONAL MINERAL FORTIFICATION OF MILK

TECHNICAL FIELD

The present invention relates to a process for producing calcium or other nutritional mineral fortified milk, toned milk, or milk powders.

BACKGROUND TO THE INVENTION

Calcium is a mineral essential in human nutrition and comprises approximately 1.5 to 2 percent of total adult body weight. Besides providing the skeletal structure for bones and teeth, calcium plays a key role in many other day-to-day functions of the body. Calcium is important for the normal clotting of blood, the conduction of nerve impulses, the contraction and relaxation of muscles as well as the regulation of body fluids, hormone secretion and cell division.

Calcium has received increased attention in dietary regimes in recent times because of its possible role in the prevention of diseases such as osteoporosis. The recommended daily allowance (RDA) for calcium is 1200 mg for women and 800 mg for men. Dairy products are considered an excellent source of calcium and the RDA is essentially met through the intake of dairy products.

Milk is a dairy product and as such a source of calcium. Milk generally contains 1200 mg per liter of calcium. However, as the demand for calcium has increased, it has become necessary to produce calcium fortified milk with a larger amount of calcium in a single serve.

A calcium fortified milk provides to people who do not choose to consume large amounts of dairy products an alternative to calcium mineral supplements.

Some Calcium fortified milk products use relatively insoluble forms of calcium such as tricalcium phosphate or calcium carbonate that have the disadvantage of having a gritty taste and sedimentation of the calcium salt. These forms of calcium require the use of suspension agents to maintain the calcium in suspension.

It has been observed that the addition of calcium salts to milk causes a drop in pH. This drop in pH is thought to be one reason for lack of heat stability in such calcium fortified milks where sedimentation occurs after pasteurisation. The raised calcium activity of milks with added calcium also contributes to heat instability. This has led some producers to add calcium after pasteurisation.

The specification of U.S. Pat. No. 5,449,523 discloses a process for the preparation of a calcium fortified yoghurt. The process includes the steps of mixing a fermentable dairy product with an alkaline agent, a chelating agent [preferably alkali metal citrates] and a source of soluble calcium. The alkaline agent and chelating agent are added to the mixture in amounts effective to maintain the pH of the yoghurt base mix above about 6.7. The yoghurt base mix is then pasteurised, cooled and inoculated with a yoghurt starter. The specification states that the invention is based on the unexpected discovery that the heat stability of yoghurt can be dramatically improved if the pH is not allowed to drop below about 6.7 prior to pasteurisation. Furthermore, a source of additional calcium can be added to the milk whilst maintaining the pH above 6.7 by adding a chelating agent and/or an alkaline agent at approximately the same time as the source of calcium in amounts effective to prevent the pH from dropping below 6.7. Experience has shown that milk stabilised with citrates and other chelating agents suffer from translucency apparently caused by migration of calcium from the protein micelles and release of casein into the serum.

Increasingly other nutritional minerals such as magnesium iron, zinc are being added to milk and milk products.

It is an object of this invention to provide heal: stable calcium and other nutritional mineral fortified milks that do not suffer any of the defects discussed above.

A further object of this invention is to produce calcium and other nutritional mineral fortified milk powders that have good heat stability when reprocessed after reconstitution.

BRIEF DESCRIPTION OF THE INVENTION

This invention is predicated on the discovery that calcium and/or nutritional mineral fortified milk can be stabilised by the addition of an effective amount of a phosphate which enables calcium and/or nutritional minerals to migrate into the protein micelles and maintains the pH so that it lies within a range from 6.5 to 7.5 preferably between pH 6.8–7.0. This is in contrast to the effect of chelating agents such as citrates and polyphosphates which at high concentrations disintegrate the casein micelle causing migration of calcium from the micelles and releasing casein into the serum. In contrast the phosphate added according to the present invention preserves the integrity of the casein micelles.

Throughout this specification the term milk or fortified milk means a milk based product including fresh milk, reconstituted milk, modified milk or enriched milk that is either intended as a beverage or as an ingredient to be used for further processing. The ingredient may be milk, concentrated milk or milk powder and further processing includes processing to make other dairy products such as cheese, yoghurt, powdered milk starting from milk, concentrated milk or milk powder.

Nutritional minerals other than calcium are iron, magnesium, zinc or manganese.

Accordingly, the present invention provides a process for producing a calcium or nutritional mineral fortified milk, the process including the steps of:
  adding a soluble calcium and/or a nutritional mineral compound to a milk,
  adding either before or after the calcium and/or nutritional mineral addition an effective amount of a phosphate which enables the calcium and/or nutritional mineral to migrate into the protein micelles and maintains the pH so that it lies within a range from 6.5 to 7.5

The preferred phosphate is a pyrophosphate or orthophosphate and is preferably one or more of monosodium dihydrogen orthophosphate, disodium hydrogen orthophosphate, tri sodium orthophosphate, monopotassium dihydrogen orthophosphate, dipotassium hydrogen orthophosphate and tri potassium orthophosphate In a further aspect, the present invention provides a calcium or nutritional mineral fortified milk which includes milk, a soluble calcium or nutritional compound and an amount of a phosphate which enables calcium or the nutritional mineral to migrate into the protein micelles and maintains the pH so that it lies within a range from 6.5 to 7.5, effective in stabilising the milk during heat treatment.

The added calcium or nutritional mineral according to the present invention does not require the addition of suspension agents. Preferably the calcium and/or nutritional mineral is added as a soluble salt. It is thought that the minerals added to the milk migrates, in the presence of ortho phosphate, into the micelle phase of the milk where it is held in colloidal suspension in the micelles. Other forms of soluble calcium or nutritional mineral when added with chelating agents such as citrates have the opposite effect of encouraging calcium migration out of the micelles which results in the translucent appearance of the milk. Because the orthophosphates encourage migration into the micelles the upper limit to calcium fortified content in heat stable milks is also increased.

The pH range which ensures heat stable fortified milk is wider when using the phosphates of this invention than is the case with chelating agents such as citrates. The pH of the calcium fortified milk may be controlled by the addition of an appropriate phosphate or orthophosphate or mix of phosphates or orthophosphates. For example, trisodium orthophosphate is highly alkaline, disodium orthophosphate is slightly alkaline and monosodium orthophosphate is mildly acidic. It is also within the scope of this invention to adjust the pH within the range of 6.5 to 7.5 using an appropriate food grade alkali or acid. The quantity of alkaline agent added to the calcium fortified milk is sufficient to cause the pH to fall within the specified range. Optimally this is close to pH 7, but adequate heat stability can be achieved if the pH lies in a range between 6.5 and 7.5.

The amount of orthophosphate added to the calcium fortified milk is largely dependent upon the amount of additional calcium added to the milk and the heat treatment to be applied. Normally, sufficient orthophosphate is added to the milk so that the ratio of added calcium to added orthophosphate is 1:1 on a molar basis. Higher or lower ratios may be utilised depending on the inherent heat stability of the milk and the level of calcium fortification. However, the ratio of added calcium to added orthophosphate would normally lie in a range from 2:1 to 1:2 on a molar basis when a high heat treatment (for example 90° C. for 10 minutes) is required. Lower levels of phosphate may be suitable to provide adequate heat stability under pasteurisation conditions (eg 72° C. for 30 seconds).

In a preferred form of the invention, 8 g of calcium is added per kilogram of finished calcium enriched skim milk solids. Thus, the actual level of calcium addition is dependent on the level of milk solids in the milk to be fortified. According to the standard text: P. Walstra and R. Jenness, "Dairy Chemistry and Physics", John Wiley & Sons, New York (1984), the calcium content of skimmed milk (containing 9 to 9.50% solids) is in the range 1200 to 1300 mg/liter. Therefore, if for example, a kilogram of standard skimmed milk contains 92.5 g of solids and 1250 mg/liter of calcium, then the required level of calcium addition would be 785 mg of calcium per kilogram of milk. The preferred level addition for the other nutritional minerals is intended to deliver the maximum recommended daily allowance per 100 g of fortified milk solids. For iron zinc and manganese these are very small amounts compared to the daily requirements for calcium and magnesium.

In some cases when the correct form of orthophosphate is used, the alkaline agent may not be required depending on the condition of the milk and the season of the year. When other forms of orthophosphate are used, the quantity of alkaline agent required will be higher, but again it will also depend on inherent milk properties.

The order of addition of calcium compound orthophosphate and pH adjustment agent to the milk is not critical. Although it is obviously easier to correctly adjust the pH, if needed, after the calcium compound and the orthophosphate have been added.

The calcium and/or nutritional mineral fortified milk of the present invention can be pasteurised (eg 72° C. for 30 seconds) or heat treated at a range of other conditions (eg: 90° C. for 10 minutes). The low or high heat treatment of milk prior to concentration and drying to produce milk powder imparts specific attributes to milk powders. For example, a high heat treatment improves the water binding capacity, viscosity and gelation characteristics of the milk when reconstituted and used in specific applications. Low heat treatment and high heat treatment will produce milk powders that conform to either a low or high heat specification based on the whey protein nitrogen index (WPNI), the specification used in the international trade for skimmed milk powders. A multitude of other heating conditions is in use in the industry, which will achieve the same WPNI specifications.

The milk may be homogenised before or after addition of the calcium source.

The addition of an appropriate mix of pyrophosphates or orthophosphates to the milk or toned milk maintains the pH range similar to that of conventional milk. A resultant improvement in heat stability allows one to prepare a calcium-fortified milk wherein the calcium source can be added to the milk prior to heat treatment and/or pasteurisation without the undesirable formation of a milk protein precipitate.

The milk or toned milk may be homogenised. Any commonly employed homogenisation conditions can be satisfactorily employed in the present invention.

The heating step is carried out using techniques well known in the field, preferably at specified times and temperatures. At high levels of calcium fortification ultra-high temperatures are generally not employed for heating.

The milk or toned milk thus obtained can be enriched with calcium to a level 60% above that of the untreated milk.

In a third aspect of the invention, there is provided a process for producing a calcium fortified milk or toned milk powder, the process including the steps of:
  adding a soluble calcium and or/a nutritional mineral compound to a milk,
  adding either before or after the calcium and/or nutritional mineral addition an effective amount of a phosphate which enables calcium and/or nutritional mineral to migrate into the protein micelles and maintains the pH so that it lies within a range from 6.5 to 7.5
  pasteurising or heating the calcium fortified milk, and
  concentrating and dehydrating the milk to form a calcium and/or nutritional mineral fortified dry milk or toned milk powder.

The calcium compound employed in the present invention is any food grade calcium source preferably a water-soluble calcium salt such as calcium gluconate, calcium chloride and calcium hydroxide. The nutritional mineral salts are also food grade water soluble chlorides or salts usually used in foods The orthophosphate preferably employed in the present invention includes monosodium dihydrogen orthophosphate, disodium hydrogen orthophosphate, trisodium orthophosphate, monopotassium dihydrogen orthophosphate, dipotassium hydrogen orthophosphate and tri potassium orthophosphate.

It is preferred that the sequence of addition of the above-mentioned substances to the milk is orthophosphate, followed by calcium and/or nutritional mineral source and alkaline or acidifying agent if necessary.

The alkaline agent utilised in the process is preferably any food grade alkaline agent that has a minimal effect on the taste, or smell of the milk or toned milk. Preferred alkaline agents include alkali metal hydroxides. Preferred alkali metal hydroxides include potassium hydroxide, sodium hydroxide or mixtures thereof.

A resultant improvement in heat stability allows one to prepare a calcium-fortified milk wherein the calcium source can be added to the milk prior to heat treatment and/or pasteurisation without the undesirable formation of a milk protein precipitate.

The dehydration step can be carried out using a variety of conventional techniques including spray drying, roller drying and freeze drying, however, spray drying is a preferred means for dehydration. Spray drying of the calcium fortified and concentrated milk or toned milk can be conducted under conventional conditions.

The milk or toned milk powder thus obtained is enriched with calcium some 60% above that of the untreated milk or toned milk.

EXAMPLE 1

The use of a range of phosphates (orthophosphate, pyrophosphate, tripolyphosphate, polyphosphate) for stabilising Ca fortified milks was examined. Each of these has a differing effect on milk and could be used to stabilise Ca fortified milks (See Table 1). Without additives, skim milks (10% milk solids) with 20 mM added calcium form a precipitate on heating at 90° C. for 10 min. The effect of added citrate and longer chain phosphates (polyphosphate), which is commonly used to stabilise Ca fortified milks, are included for comparison.

It was observed that citrate and the polyphosphate have a tendency to cause the milk to lose its whiteness (before heating) and it may take on a undesirable greenish—yellowish hue.

TABLE 1

Use of different additives for stabilising reconstituted skim milks (10% skim milk solids) with added ~20 mM added Ca under selected conditions.

| | Before heat | | After heat (90° C./10 min) | | |
|---|---|---|---|---|---|
| Additive | pH | Free Ca activity (mM) | Viscosity (cPoise) | Total Ca (mg/litre) | Supernatant Ca (mg/litre) |
| Control skim milk (10% milk solids) without added Ca at the natural pH | | | | | |
| None* | 6.63 | 1.78 | 1.7 | 1470 | 1450 |
| Skim milk (10% milk solids) with added Ca at pH ~7 | | | | | |
| 20 mM orthophosphate* ($K_3PO_4/K_2HPO_4$ mix)* | 6.91 | 1.29 | 2.3 | 2290 | 2280 |
| 4 mM pyrophosphate ($Na_4P_2O_7$) | 7.12 | 2.5 | 2.3 | nd | nd |
| 4 mM tripolyphosphate ($Na_3P_3O_{10}$) | 7.00 | 2.54 | 2.4 | 2270 | 2220 |
| 8 mM tripolyphosphate ($Na_3P_3O_{10}$) | 7.00 | 1.1 | 2.7 | 2240 | 2220 |
| 12 mM tripolyphosphate ($Na_3P_3O_{10}$) | 7.01 | 0.64 | 3.2 | 2260 | 2260 |
| 0.15% Polyphosphate (Calgon T) | 7.01 | 2.45 | 2.4 | 2580 | 2470 |
| 10 mM $Na_3$citrate | 7.00 | 2.65 | 2.0 | 2250 | 2230 |
| 20 mM $Na_3$citrate | 7.00 | 1.86 | 2.0 | 2090 | 2120 |

*In these systems, NaOH was not used. In all other systems, NaOH was used to adjust the pH of the milks to pH 7
nd—not determined In another aspect of this invention there is provided a method of testing to determine the heat sensitivity of the milk and consequently the type and quantity of phosphate needed to stabilise the fortified milk. The first method is simply to add a predetermined amount of calcium salt and orthophosphate and measure the pH. If the pH is within the range of 6.5 to 7.5 no further action is needed. If the pH lies outside that range the pH may be adjusted or the mix of ortho phosphates changed to bring the pH within the desired range of 6.5 to 7.5.

DETAILED DESCRIPTION OF THE INVENTION

In order to demonstrate the present invention, a number of experiments were conducted by the present inventors. The experiments investigated a process of producing calcium fortified milk or toned milk and further to this the production of calcium fortified milk and toned milk dry powder.

Supernatant Ca is that remaining in the supernatant of heated milk after low speed centrifugation (182 g for 10 min). It is an indication of calcium that is not precipitated by the heating process; n=data not recorded, na–not applicable

EXAMPLE 2

Table 2 shows the effects of added orthophosphates on heat stability of Ca fortified milks with 20 mM added calcium. When no orthophosphate is added, skim milks (10% milk solids) with 20 mM added calcium form a precipitate on heating at 90° C. for 10 min. Milks with a 1 to 1 molar ratio of added Ca to added phosphate are stable from ~pH 6.4 to pH 7.8. By altering the ratios of added tri-:di-:mono-potassium orthophosphate the pH may be adjusted within the range 7.1 to 5.8 without the use of added NaOH.

TABLE 2

Heat stability- pH profile for Ca fortified skim milks (10% milk solids containing 20 mM added calcium) stabilised with added orthophosphates

| Type of added phosphate | | | | Before heat | | After heat (90° C./10 min) | |
|---|---|---|---|---|---|---|---|
| Added K$_3$PO$_4$ | Added K$_2$HPO$_4$ | Added KH$_2$PO$_4$ | pH | Free Calcium (mM) | | Viscosity[1] (cPoise) | Sediment[2] (ml/50 ml milk) |
| — | — | — | 6.19 | 13.1 | | precipitated | nd |
| 20 mM | — | — | 7.67 | 0.55 | | 2.8 | 0.1 |
| 20 mM | — | — | 7.61 | 0.77 | | 3.2 | 0.3 |
| 20 mM | — | — | 7.56 | 0.64 | | 2.6 | 0.2 |
| 20 mM | — | — | 7.43 | 0.76 | | 2.6 | 0.1 |
| 20 mM | — | — | 7.33 | 0.88 | | 2.5 | 0.2 |
| 20 mM | — | — | 7.23 | 0.95 | | 2.6 | 0.1 |
| 20 mM | — | — | 7.19 | 1.02 | | 2.7 | 0.1 |
| 20 mM | — | — | 7.04 | 1.38 | | 2.5 | <0.1 |
| 16 mM | 4 mM | — | 6.89 | 1.62 | | 2.3 | 0.1 |
| 12 mM | 8 mM | — | 6.75 | 1.98 | | 2.4 | 0.2 |
| 8 mM | 12 mM | — | 6.63 | 2.22 | | 2.5 | <0.1 |
| 4 mM | 16 mM | — | 6.52 | 2.72 | | 2.5 | 0.2 |
| — | 20 mM | — | 6.41 | 3.36 | | 4.2 | 0.1 |
| — | 16 mM | 4 mM | 6.28 | 4.16 | | 7.0 | 0.5 |
| — | 12 mM | 8 mM | 6.14 | 5.33 | | precipitated | nd |
| — | 8 mM | 12 mM | 6.01 | 6.71 | | precipitated | nd |
| — | 4 mM | 16 mM | 5.86 | 9.49 | | precipitated | nd |
| — | — | 20 mM | 5.79 | 9.42 | | precipitated | nd |

[1]Determined at 30 rpm with a Brookfield LVDT-II viscometer fitted with a UL adaptor (equivalent to 36.7 s$^{-1}$)
[2]Determined as volume of sediment obtained following centrifugation of a 50 mL sample (Beckman J6-HC centrifuge, JA4.2 rotor, 800 rpm, 10 minutes - equivalent to ~182xg 10 minutes)
*The pH of these samples was adjusted by the addition of NaOH
nd—not determined

EXAMPLE 3

Table 3 shows the effects of added tripolyphosphate on heat stability of Ca fortified milks with 20 mM added Ca. These examples demonstrate that tripolyphosphate is effective in stabilising Ca fortified milks over a wide range of pH when the correct ratio of added Ca added tripolyphosphate is used. Visual examination of the milks with added tripolyphosphate indicated that these milks developed an undesirable translucency

TABLE 3

Heat stability - pH profile for Ca fortified skim milks (10% milk solids containing 20 mM added calcium) containing tripolyphosphate at three concentrations

| Added Sodium Tripolyphosphate (Na$_3$P$_3$O$_{10}$) | Before heat | | After heat (90° C./10 min) | |
|---|---|---|---|---|
| | pH | Free Calcium (mM) | Viscosity[1] (cPoise) | Sediment[2] (mg/50 ml) |
| 0 | 6.19 | 13.61 | precipitated | nd |
| 4 mM | 6.14 | 6.38 | >20 | nd |
| 4 mM | 6.39* | 4.96 | 7.4 | 14 |
| 4 mM | 6.65* | 3.64 | 2.6 | 0.7 |
| 4 mM | 6.69* | 3.23 | 2.5 | 1 |
| 4 mM | 6.84* | 2.93 | 2.6 | 0.2 |
| 4 mM | 7.02* | 2.41 | 2.3 | 0.1 |
| 4 mM | 7.22* | 1.89 | 2.5 | 0.2 |
| 4 mM | 7.51* | 1.50 | 2.7 | 0.2 |
| 8 mM | 6.29 | 2.47 | 2.6 | 0.9 |
| 8 mM | 6.56* | 1.76 | 2.6 | 0.5 |
| 8 mM | 6.69* | 1.53 | 2.7 | 0.2 |
| 8 mM | 6.84* | 1.28 | 2.8 | 0.2 |
| 8 mM | 7.08* | 0.93 | 2.7 | 0.1 |
| 8 mM | 7.17* | 0.85 | 2.8 | 0.2 |
| 8 mM | 7.36* | 0.71 | 2.9 | 0.1 |
| 8 mM | 7.82* | 0.48 | 4.7 | 0.4 |
| 12 mM | 6.51 | 1.27 | 2.4 | 0.1 |
| 12 mM | 6.75* | 1 | 2.6 | 0.2 |
| 12 mM | 6.88* | 0.8 | 2.8 | 0.1 |
| 12 mM | 7.03* | 0.71 | 3.8 | 0.2 |
| 12 mM | 7.14* | 0.62 | 14.4 | 0.3 |
| 12 mM | 7.34* | 0.53 | >20 | 0.2 |
| 12 mM | 7.54* | 0.44 | >20 | nd |
| 12 mM | 7.79* | 0.34 | >20 | nd |

[1]Determined at 30 rpm with a Brookfield LVDT-II viscometer fitted with a UL adaptor (equivalent to 36.7 s$^{-1}$)
[2]Determined as volume of sediment obtained following centrifugation of a 50 mL sample (Beckman J6-HC centrifuge, JA4.2 rotor, 800 rpm, 10 minutes - equivalent to ~182xg 10 minutes)
*The pH of these samples was adjusted by the addition of NaOH;
n.d—not determined

EXAMPLE 4

Table 4 shows the effects of added pyrophosphate on heat stability of Ca fortified milks with 20 mM added Ca. Pyrophosphates are less effective in providing heat stability and they also cause an increase in the viscosity of the calcium fortified milks, both before and after heating. At lower pH values, gels form in Ca fortified milks with added pyrophosphate before heating. Other studies have previously shown that pyrophosphates increase the viscosity of milk. Vujicic I., deMan J. M., and Woodrow I. L. *"Interaction of Polyphosphates and Citrates with Skim milk Proteins."*, Can. Inst. Food Technol. J. 117 (1968)

TABLE 4

Heat stability- pH profile for Ca fortified skim milks (10% milk solids containing 20 mM added calcium) containing pyrophosphate at two concentrations

| milk solids non-fat | Added Sodium Pyrophosphate ($Na_4P_2O_7$) | pH | Before heat Free Calcium (mM) | Viscosity (cPoise) | After heat (90° C./10 min) Viscosity[1] (cPoise) | Sediment[2] (mL/50 ml) |
|---|---|---|---|---|---|---|
| 10% | 0 | 6.19 | 13.61 | nd | precipitated | nd |
| 10% | 4 mM | 6.19 | 7.37 | nd | nd | nd |
| 10% | 4 mM | 6.44 | 5.31 | nd | <20 | nd |
| 10% | 4 mM | 6.57 | 4.57 | nd | 2.8 | 1.6 |
| 10% | 4 mM | 6.68 | 4.03 | nd | 2.3 | 1.2 |
| 10% | 4 mM | 6.81 | 3.24 | nd | 2.2 | 0.6 |
| 10% | 4 mM | 6.94 | 3.35 | 2.18 | 2.5 | 0.6 |
| 10% | 4 mM | 7.12 | 2.5 | nd | 2.3 | 0.5 |
| 10% | 4 mM | 7.28 | 2.17 | nd | 2.3 | 0.1 |
| 10% | 4 mM | 7.56 | 1.66 | nd | 2.4 | 0.4 |
| 10% | 8 mM | 6.30 | nd | gel | nd | nd |
| 10% | 8 mM | 6.53* | nd | gel | nd | 5.0 |
| 10% | 8 mM | 6.75* | nd | gel | nd | 3.5 |
| 10% | 8 mM | 6.85* | nd | 5.7 | 8.3 | 5.0 |
| 10% | 8 mM | 7.02* | nd | 4.9 | 4.5 | 1.3 |
| 10% | 8 mM | 7.21* | nd | 4.1 | 4.5 | 1.0 |
| 10% | 8 mM | 7.49* | nd | 3.7 | 4.0 | 0.1 |
| 10% | 8 mM | 8.09* | nd | 3.2 | 3.8 | 0.3 |

[1]Determined at 30 rpm with a Brookfield LVDT-II viscometer fitted with a UL adaptor (equivalent to 36.7 $s^{-1}$)
[2]Determined as volume of sediment obtained following centrifugation of a 50 mL sample (Beckman J6-HC centrifuge, JA4.2 rotor, 800 rpm, 10 minutes - equivalent to ~182xg 10 minutes)
*The pH of these samples was adjusted by the addition of NaOH
nd—not determined The method for production of selected Ca fortified powders are given in Examples 5–10 below. The characteristics of the powders and the heat stability of milks reconstituted from these powders are given in Table 5.

EXAMPLE 5

Production of Low Heat Skim Milk Powder Containing Approximately 8 g Added Calcium Per kg Final Powder (1:1 Molar Ratio of Calcium Chloride to Tripotassium Orthophosphate)

Solutions of calcium chloride (9.515 kg of 0.2 mole/kg $CaCl_2$ solution) and tripotassium orthophosphate (9.515 kg of 0.2 mole/kg $K_3PO_4$ solution) were mixed with skim milk (100 kg milk containing 8.9% milk solids non-fat). To this mixture was added 0.644 kg hydrochloric acid solution (1 mole/kg). The pH of the final mixture was 7.1. The Ca fortified milk mixture was pasteurised at 72° C. for 30 sec, concentrated to ~45% total solids using a double effect falling film evaporator and dried to ~4% moisture in a Niro Production Minor.

EXAMPLE 6

Production of High Heat Skim Milk Powder Containing Approximately 8 g Added Calcium Per kg Final Powder (1:1 Molar Ratio of Calcium Chloride to Tripotassium Orthophosphate)

Solutions of calcium chloride (9.515 kg of 0.2 mole/kg $CaCl_2$ solution) and tripotassium orthophosphate (9.515 kg of 0.2 mole/kg $K_3PO_4$ solution) were mixed with skim milk (100 kg milk containing 8.9% milk solids non-fat). To this mixture was added 0.644 kg hydrochloric acid solution (1 mole/kg). The pH of the final mixture was 7.1. The Ca fortified milk mixture was heated at 90° C. for 10 min, concentrated to ~45% total solids using a double effect falling film evaporator and dried to ~4% moisture in a Niro Production Minor.

EXAMPLE 7

Production of Low Heat Skim Milk Powder Containing Approximately 8 g Added Calcium Per kg Final Powder (1:1 Molar Ratio of Calcium Chloride to Monosodium Dihydrogen Orthophosphate)

Solutions of calcium chloride (9.510 kg of 0.2 mole/kg $CaCl_2$ solution) and tripotassium orthophosphate (9.510 kg of a solution containing 0.2 mole $NaH_2PO_4$ and 0.32 mole KOH/kg) were mixed with skim milk (100 kg milk containing 8.9% milk solids non-fat). To this mixture was added 0.6 kg potassium hydroxide solution (1.0 mole/kg). The pH of the final mixture was 7.0. The Ca fortified milk mixture was pastuerised at 72° C. for 30 sec, concentrated to ~45% total solids using a double effect falling film evaporator and dried to ~4% moisture in a Niro Production Minor.

EXAMPLE 8

Production of High Heat Skim Milk Powder Containing Approximately 8 g Added Calcium Per kg Final Powder (1:1 Molar Ratio of Calcium Chloride to Monosodium Dihydrogen Orthophosphate)

Solutions of calcium chloride (9.510 kg of 0.2 mole/kg $CaCl_2$ solution) and tripotassium orthophosphate (9.510 kg of a solution containing 0.2 mole $NaH_2PO_4$ and 0.32 mole KOH/kg) were mixed with skim milk (100 kg milk containing 8.9% milk solids non-fat). To this mixture was added 0.6 kg potassium hydroxide solution (1.0 mole/kg). The pH of the final mixture was 7.0. The Ca fortified milk mixture was heated at 90° C. for 10 min, concentrated to ~45% total solids using a double effect falling film evaporator and dried to ~4% moisture in a Niro Production Minor.

EXAMPLE 9

Production of Low Heat Full-cream Milk Powder Containing Approximately 8 g Added Calcium Per kg Final Powder (1:1 Molar Ratio of Calcium Chloride to Monosodium Dihydrogen Orthophosphate)

Solutions of calcium chloride (13.89 kg of 0.2 mole/kg $CaCl_2$ solution) and monosodium dihydrogen orthophosphate (13.89 kg of a solution containing 0.2 mole $NaH_2PO_4$ and 0.32 mol KOH/kg) were mixed with full-cream milk (100 kg milk containing 8.9% milk solids non-fat and 4% fat). The pH of the final mixture was 6.9. The Ca fortified milk mixture was pasteurised at 72° C. for 30 sec, concentrated to ~45% total solids using a double effect falling film evaporator and dried to ~4% moisture in a Niro Production Minor.

EXAMPLE 10

Production of High Heat Full-cream Milk Powder Containing Approximately 8 g Added Calcium Per kg Final Powder (1:1 Molar Ratio of Calcium Chloride to Monosodium Dihydrogen Orthophosphate)

Solutions of calcium chloride (13.89 kg of 0.2 mole/kg $CaCl_2$ solution) and monosodium dihydrogen orthophosphate (13.89 of a solution containing 0.2 mole $NaH_2PO_4$ and 0.32 mol KOH/kg) were mixed with full-cream milk (100 kg milk containing 8.9% milk solids non-fat and 4% fat). The pH of the final mixture was 6.9. The Ca fortified milk mixture was heated at 90° C. for 10 min, concentrated to ~45% total solids using a double effect falling film evaporator and dried to ~4% moisture in a Niro Production Minor.

TABLE 5

Characteristics of milks obtained on reconstitution of Ca fortified powders at (skim milks: 10%, full cream milks 12.5% total solids,)

| | Reconstituted Milks | | | |
|---|---|---|---|---|
| Examples | pH | Total Ca mg/litre | Viscosity before heating (cPoise) | Viscosity after heating (90° C./ 10 min) (cPoise) |
| Low heat skim milk powder containing approximately 8 g added calcium per kg final powder (1:1 molar ratio of calcium chloride to tripotassium orthophosphate) | 7.0 | 2170 | 2.2 | 2.1 |
| High heat skim milk powder containing approximately 8 g added calcium per kg final powder (1:1 molar ratio of calcium chloride to tripotassium orthophosphate) | 7.0 | 2125 | 2.3 | 2.1 |
| Low heat skim milk powder containing approximately 8 g added calcium per kg final powder (1:1 molar ratio of calcium chloride to monosodium dihydrogen orthophosphate) | 6.8 | 2110 | 2.2 | 2.0 |
| High heat skim milk powder containing approximately 8 g added calcium per kg final powder (1:1 molar ratio of calcium chloride to monosodium dihydrogen orthophosphate) | 6.8 | 2095 | 2.4 | 2.0 |
| Low heat full-cream milk powder containing approximately 8 g added calcium per kg final powder (1:1 molar ratio of calcium chloride to monosodium dihydrogen orthophosphate) | 6.6 | 2210 | 3.5 | 4.4 |
| High heat full-cream milk powder containing approximately 8 g added calcium per kg final powder (1:1 molar ratio of calcium chloride to monosodium dihydrogen orthophosphate) powder | 6.5 | 2205 | 3.5 | 2.5 |

All milks made by reconstituting the milk powders produced in examples 5 to 10 were stable to heat processing at 90° C. for 10 minutes.

EXAMPLE 11

The addition of magnesium to milk is illustrated in table 6. 20 mM magnesium was added with orthophosphates. When no orthophosphate is added, skim milks (10% milk solids) with 20 mM added magnesium form a precipitate on heating at 90° C. for 10 min. The non fat milk solids in all of the compositions was 10%.

TABLE 6

Heat stability- pH profile for Ca fortified skim milks (10% milk solids containing 20 mM added magnesium) stabilised with added orthophosphates

| Added $K_3PO_4$ | Added $K_2HPO_4$ | Added $KH_2PO_4$ | pH | Before heat Free Calcium | After heat (90° C./10 min) Viscosity[1] | Sediment[2] |
|---|---|---|---|---|---|---|
| 0 | 0 | 0 | 6.37 | 4.31 | precipitated | nd |
| 20 mM | | | 8.42* | 0.09 | 3.6 | <0.1 |
| 20 mM | | | 8.14* | 0.14 | 3.9 | 0.1 |
| 20 mM | | | 8.00* | 0.18 | 3.2 | <0.1 |
| 20 mM | | | 7.89* | 0.20 | 2.8 | 0.1 |
| 20 mM | | | 7.77* | 0.24 | 2.4 | <0.1 |
| 20 mM | | | 7.71* | 0.24 | 2.3 | <0.1 |
| 20 mM | | | 7.56 | 0.3 | 2.7 | <0.1 |
| 16 mM | 4 mM | | 7.29 | 0.36 | 2.1 | 0.1 |
| 12 mM | 8 mM | | 7.10 | 0.54 | 2.0 | 0.1 |
| 8 mM | 12 mM | | 6.91 | 0.71 | 2.0 | <0.1 |
| 4 mM | 16 mM | | 6.76 | 0.94 | 2.0 | 0.1 |
| | 20 mM | | 6.60 | 1.30 | 2.1 | 0.1 |
| | 16 mM | 4 mM | 6.50 | 1.71 | 4.2 | <0.1 |
| | 12 mM | 8 mM | 6.37 | 2.17 | precipitated | nd |
| | 8 mM | 12 mM | 6.26 | 2.75 | precipitated | nd |
| | 4 mM | 16 mM | 6.15 | 3.38 | precipitated | nd |
| | | 20 mM | 6.03 | 4.18 | precipitated | nd |

[1]Determined at 30 rpm with a Brookfield LVDT-II viscometer fitted with a UL adaptor (equivalent to 36.7 s$^{-1}$)
[2]Determined as volume of sediment obtained following centrifugation (Beckman J6-HC centrifuge, JA4.2 rotor, 800 rpm, 10 minutes - equivalent to ~182xg 10 minutes)
*The pH of these samples was adjusted by the addition of NaOH

EXAMPLE 12

The profile of milk additions of magnesium and calcium with orthophosphates is shown in table 7

TABLE 7

| Added $MgCl_2$ | Added $CaCl_2$ | Added $K_3PO_4$ | Added $K_2HPO_4$ | Before heat pH | Free Calcium | After heat (90° C./10 min) Viscosity[1] | Sediment[2] |
|---|---|---|---|---|---|---|---|
| 20 mM | — | — | — | 6.37 | 4.31 | precipitated | nd |
| 20 mM | 0 | 12 mM | 8 mM | 7.10 | 0.52 | 2.05 | 0.1 |
| 16 mM | 4 mM | 12 mM | 8 mM | 7.05 | 0.65 | 2.05 | 0.2 |
| 12 mM | 8 mM | 14 mM | 6 mM | 7.09 | 0.66 | 2.1 | <0.1 |
| 8 mM | 12 mM | 14 mM | 6 mM | 7.06 | 0.76 | 2.16 | <0.1 |
| 4 mM | 16 mM | 16 mM | 4 mM | 7.16 | 0.74 | 2.3 | 0.1 |
| 2 mM | 18 mM | 16 mM | 4 mM | 7.13 | 0.83 | 2.34 | 0.3 |
| 0 | 20 mM | 16 mM | 4 mM | 7.12 | 0.85 | 2.37 | 0.4 |

EXAMPLE 13

The relative performance of orthophosphates and other complexing agents on the distribution of calcium and protein in the serum phase of skim milk or mineral adjusted skim milk was examined.

Skim milk and mineral adjusted skim milks (20 mM added calcium) were prepared and the milk serum fractions were obtained by centrifugation (70,000×g 90 minutes). The calcium and protein concentrations of each of the milks and their serum fractions were analysed. The types of protein present in the serum fractions of the skim milk and mineral adjusted skim milk were determined by capillary electrophoresis. The results of experiments are shown in table 8.

Distribution of Calcium

The control (unadjusted) skim milk demonstrates that the calcium concentration of the supernatant (serum) phase of the milk was of the order of one quarter of the concentration in the un-fractionated milk. The addition of calcium alone to the milk, caused little change in the proportion of the calcium in the serum phase. The addition of orthophosphate ($PO_4^{3-}$) in association with calcium caused a considerable reduction in the proportion of calcium in the serum phase. When longer chain forms of phosphate; pyrophosphate ($P_2O_5$), tripolyphosphate ($P_3O_{10}$) or Calgon T ($P_nO_{3n+1}$ n=10~12) were added in combination with calcium chloride there was also a reduction in the proportion of the calcium in the serum phase but to a lesser extent than that occurring with orthophosphate. The addition of citrate caused a major increase in the proportion of calcium in the serum fraction increasing it to more than twice that seen in either unadjusted milk or milk with 20 mM added calcium.

Distribution of Protein

The control (unadjusted) milk demonstrates that the normal protein concentration of the milk serum was about one fifth of the protein concentration of the unfractionated milk. The majority of the serum proteins are the "whey" proteins but a small proportion are serum caseins which occur in equilibrium with the micellar caseins. The addition of calcium alone, or calcium and ortho-phosphate to the milk caused a reduction in the relative concentration of protein in the milk serum, implying that the calcium, ortho-phosphate, and protein migrate together into the micellar phase. Addition of pyro-phosphate has a similar effect to the addition of ortho-phosphate, while tripoly-phosphate and citrate cause an increase in the proportion of protein found in the serum. Calgon T has an effect intermediate between ortho-phosphate and citrate.

Distribution of Protein Types

Analysis of the control (unadjusted) milk and the serum phases of the control and adjusted milks demonstrated little change in the levels of the two major whey proteins β lactoglobulin and α-lactalbumin with any of the treatments. This indicates that these proteins, which form the majority of the serum proteins, are not involved in the mineral induced re-distribution between serum and micellar phases. Considerable changes were observed in the distribution of caseins. In general the patterns shown follow the changes observed in the analysis of protein nitrogen. Adding calcium causes a reduction in the supernatant casein concentration compared to the supernatant from un-modified skim milk. This is also observed when orthophosphate or pyrophosphate are added together with the calcium. The addition of tripolyphosphate, or citrate with calcium cause an increase in the levels of the caseins in the serum phase to varying degrees. Calgon T has an effect intermediate between orthophosphate and citrate.

The patterns shown here demonstrate that there are clearly identifiable differences in the effect that a number of different calcium complexing agents have on the distributions of protein and calcium between the serum and micellar phases of skim milk. The preferred ingredient for our process, orthophosphate can easily be differentiated from other typically used agents such as citrate or poly phosphate through an evaluation of the protein contents of the supernatant phases. Citrate also causes a markedly different distribution of calcium. Of the two other forms of phosphate tested, tripolyphosphate shows considerable differences in the protein distribution, while although pyrophosphate is not easily distinguished by these methods other tests have shown that it is less effective in providing stabilisation.

14.00%, Guar Gum 0.1% Carboxymethyl cellulose (CMC) 0.1%, and Glycerol monostearate (GMS) 0.2%, Vanilla flavour 0.35%. The remainder of the formulation comprised of water Production of Ice Cream The ice cream mixes were prepared by combining the milk concentrates (obtained either directly from the plant or by reconstituting milk powder) with a blend of sugar, Guar Gum, and CMC in water then adding an emulsifier-cream mix of GMS in cream. The complete mix was then homogenised (40° C., 2500 psi first stage 500 psi second stage) and pasteurised (80° C., 30 seconds) using a tubular heat exchanger. The appropriate amount of vanilla flavouring was then added. This mix was then "aged" at 4° C. for 24 hours. The aged ice cream mix was frozen using a GEL-MAK 160 continuous ice cream freezer. The machine was operated to give a temperature at the outlet of −5° C. Following freezing samples were stored at −30° C. for hardening (24 hours) then transferred to −20° C. for storage.

TABLE 8

Levels of calcium and protein in complete and serum fractions of control milk (unadjusted) or mineral adjusted skim milks:

|  | trial | Calcium | | | Protein | | |
| --- | --- | --- | --- | --- | --- | --- | --- |
|  |  | total solution mg/litre | supernatant mg/litre | relative concentration | total solution % | supernatant % | relative concentration |
| Control milk | 1 | 1240 | 307 | 24.8% | 3.16 | 0.68 | 21.6% |
|  | 2 | 1230 | 326 | 26.5% | 3.11 | 0.66 | 21.2% |
| Milk + 20 mM CaCl$_2$ | 1 | 2085 | 496 | 23.8% | 3.11 | 0.52 | 16.8% |
|  | 2 | 2205 | 602 | 27.3% | 3.55 | 0.57 | 16.0% |
| Milk + 20 mM CaCl$_2$ + | 1 | 2123 | 264 | 12.4% | 3.22 | 0.57 | 17.8% |
| 20 mM orthophosphate | 2 | 2063 | 310 | 15.0% | 3.11 | 0.53 | 17.1% |
| Milk + 20 mM CaCl$_2$ + | 1 | 2058 | 365 | 17.7% | 3.09 | 0.58 | 18.8% |
| 4 mM pyrophosphate | 2 | 2068 | 484 | 23.4% | 2.87 | 0.52 | 18.2% |
| Milk + 20 mM CaCl$_2$ + | 1 | 2068 | 352 | 17.0% | 3.09 | 1.01 | 32.9% |
| 8 mM tripolyphosphate | 2 | 2088 | 389 | 18.6% | 3.20 | 0.80 | 24.9% |
| Milk + 20 mM CaCl$_2$ + | 1 | 2223 | 367 | 16.5% | 3.36 | 0.69 | 20.5% |
| 0.15% Calgon T | 2 | 2078 | 471 | 22.6% | 3.19 | 0.54 | 17.0% |
| Milk + 20 mM CaCl$_2$ + | 1 | 2098 | 1325 | 63.2% | 3.16 | 0.82 | 25.9% |
| 20 mM Citrate | 2 | 2020 | 1151 | 57.0% | 2.94 | 0.74 | 25.2% |

Relative concentrations are calculated as 100× concentration in supernatant/concentration in total solution.

EXAMPLE 14

Use of Fortified Milk Powders and Milk Concentrates in Pilot Scale Production if Ice Cream Ice creams were manufactured at a pilot scale to investigate the suitability of using calcium fortified milk powder with 8 g added calcium/kg fortified solids or calcium fortified milk concentrates manufactured as described in Example 9 as ingredients. Control ice creams were produced using a non-fortified milk powder or concentrate manufactured at the same time as a control. Milk solids were incorporated into the formulation by either using skim milk powder or skim milk concentrates.

Formulation

The compositions of the ice cream pre-mixes used were: Milk-solids-not-fat 11.00%, Milk fat 11.00%, Sucrose Analysis Analysis of the ice cream took place seven days after freezing.

Meltdown

Meltdown tests samples were performed on samples filled directly from the ice-cream freezer into specially prepared two-piece cylindrical plastic moulds. The samples were hardened as described above then equilibrated at −20° C. before testing. Samples were removed from the moulds and placed on a stainless-steel mesh screen (3 mm mesh) and the mass of the melted portion passing through the screen was recorded at 15 minute intervals for up to two hours. Ice creams made with either the fortified or non-fortified milk powders melted at about the same rate and melted completely within 105 minutes. Where concentrates were used, the melting rates were different with the calcium fortified ice cream melting within 75 minutes while the control ice cream was still melting after 2 hours.

Firmness

Firmness was measured using an Instron Universal Testing Machine (model 5564) equipped with a 500N load cell.

The force required to penetrate the sample with a 5 mm cylindrical probe at a speed of 50 mm/min to a depth of 50 mm was recorded. Where fortified or non-fortified milk powders were used no significant differences could be identified between the control and calcium fortified samples. With concentrates control (unfortified) ice cream was slightly firmer.

Sensory Testing

Informal sensory testing was conducted by giving coded samples to individuals and eliciting spontaneous impressions. Little difference in flavour could be found between the two products.

This work demonstrates that the milk powders or concentrates with enhanced levels of calcium, produced by the process as claimed in claim 1, may be used to produce calcium fortified ice-cream which has generally similar physical characteristics to non-fortified ice cream. The fortified ice cream has minimal flavour differences compared to the non-fortified ice-cream.

EXAMPLE 15

Use of Fortified Milk Powders (8 g Added Calcium/kg Fortified Solids) in UHT Applications Milk based beverages were prepared using calcium fortified milk powders with 8 g added calcium/kg fortified solids produced as described in Example 9 as the source of milk solids. The pH of the samples was further adjusted through the use of Sodium hydroxide. They were processed in model UHT equipment giving a heat treatment of 140° C. for three seconds. The viscosity of the samples was determined after heating. This demonstrates the potential for these powders to be utilised in sweetened dairy based beverages, provided the appropriate pH is selected.

TABLE 9

Properties of milk based beverages (8.5% milk solids non-fat, 3.5% milk fat, and 6% sugar) produced with calcium fortifed milk solids before and after UHT treatment.

| Sample | Before UHT treatment pH | After UHT treatment (140° C./3 seconds) Viscosity (cPoise)[1] | Sediment (ml/50 ml) |
|---|---|---|---|
| Calcium fortified low heat milk with fat and sugar | 6.72 | off scale | >20 |
| Calcium fortified low heat milk with fat and sugar. pH adjusted to ~7.0 | 7.07 | 30.7 (12 rpm) | 4 |
| Calcium fortified low heat milk with fat and sugar. pH adjusted to ~7.2 | 7.24 | 16.3 | 2 |
| Calcium fortified low heat milk with fat and sugar. pH adjusted to ~7.4 | 7.44 | 8.12 | 1.4 |

[1]Determined at 30 rpm with a Brookfield LVDT-II viscometer fitted with a UL adaptor (equivalent to 36.7 s$^{-1}$)

CONCLUSIONS

The mechanism of action of orthophosphate in milk is unique. This is because of its effects on the dynamic equilibria between Ca, phosphate and the casein micelle. In milk, addition of orthophosphates reduces Ca activity as well as impacts on the composition of the casein micelle. Whilst orthophosphate and other agents such as polyphosphate and citrate can be used to improve the heat stability of other proteins such as soy proteins that are sensitive to heat, the action in systems other than milk is mainly due to the lowering of the Ca activity. This reduces the sensitivity of the proteins to heat aggregation. Heat stability of Ca fortified milk with up to 25 mM added Ca has been successfully achieved with judicious addition of orthophosphate and pH control A 1:1 molar ratio of added Ca:added orthophosphate has generally been used to achieve heat stability in Ca fortified milks. Lower ratios may be used but this decreased the range of pH over which the Ca fortified milks are heat stable. By selecting suitable combinations of added orthophosphates, the viscosity of the heated solution should be low, and preferably less than about 3 cPoise and the sediment obtained on centrifugation of heated solutions should be <0.5 ml/50 mL milk.

What is claimed is:

1. A process for producing a calcium and/or nutritional metal fortified milk comprising:
   a) adding a soluble calcium and/or nutritional metal compound to a milk,
   b) adding either before or after the calcium and/or nutritional metal addition an effective amount of a phosphate which enables calcium and/or nutritional metal to migrate into the protein micelles and maintains the pH so that it lies within a range from 6.5 to 7.5 wherein the phosphate is selected from one or more of monosodium dihydrogen orthophosphate, disodium hydrogen orthophosphate, trisodium orthophosphate, monopotassium dihydrogen orthophosphate, dipotassium hydrogen orthophosphate and tri potassium orthophosphate.

2. A calcium and/or nutritional mineral fortified milk which comprises milk, a calcium and/or nutritional mineral compound and an amount of a phosphate which enables calcium and/or nutritional mineral to migrate into the protein micelles and maintains the pH so that it lies within a range from 6.5 to 7.5, effective in stabilising the milk during heat treatment, wherein the phosphate is selected from one or more of monosodium dihydrogen orthophosphate, disodium hydrogen orthophosphate, trisodium orthophosphate, monopotassium dihydrogen orthophosphate, dipotassium hydrogen orthophosphate and tri potassium orthophosphate.

3. A process for producing a calcium and/or nutritional mineral fortified milk or toned milk powder comprising:
   a) adding a soluble calcium and/or nutritional mineral compound to a milk,
   b) adding either before of after the calcium and/or nutritional mineral addition an effective amount of a phosphate selected from one or more of monosodium dihydrogen orthophosphate, disodium hydrogen orthophosphate, trisodium orthophosphate, monopotassium dihydrogen orthophosphate, dipotassium hydrogen orthophosphate and tri potassium orthophosphate, which phosphate enables calcium and/or nutritional mineral to migrate into the protein micelles and maintains the pH so that it lies within a range from 6.5 to 7.5,
   c) pasteurising or heating the calcium and/or nutritional mineral fortified milk, and
   d) concentrating and dehydrating the milk to form a calcium and/or nutritional mineral fortified dry milk or toned milk powder.

4. A fortified milk as claimed in claim 2 in which the nutritional mineral is selected from one or more water soluble compounds of magnesium, iron zinc and manganese.

5. A fortified milk powder produced by the process of claim 3.

* * * * *

UNITED STATES PATENT AND TRADEMARK OFFICE
CERTIFICATE OF CORRECTION

PATENT NO. : 6,991,823 B2
APPLICATION NO. : 10/240169
DATED : January 31, 2006
INVENTOR(S) : Mary Ann Augustin et al.

It is certified that error appears in the above-identified patent and that said Letters Patent is hereby corrected as shown below:

Title page
Item (73) Assignees:

Please change "Commonwealth Scientific & Industrial Research Organization Centre" to
--Commonwealth Scientific & Industrial Research Organization--.

Signed and Sealed this

Fifth Day of October, 2010

David J. Kappos
*Director of the United States Patent and Trademark Office*